United States Patent
Esmailzadeh et al.

(10) Patent No.: US 6,813,261 B1
(45) Date of Patent: Nov. 2, 2004

(54) METHOD OF MOBILE COMMUNICATION AND APPARATUS THEREFOR

(75) Inventors: Riaz Esmailzadeh, Yokohama (JP); Takashi Yano, Tokorozawa (JP); Nobukazu Doi, Hachiouji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/512,820

(22) Filed: Feb. 25, 2000

Related U.S. Application Data

(63) Continuation of application No. 08/907,088, filed on Aug. 6, 1997, now Pat. No. 6,111,869.

(30) Foreign Application Priority Data

Aug. 7, 1996 (JP) .............................................. 8-208035

(51) Int. Cl.⁷ .............................................. H04B 7/216
(52) U.S. Cl. ...................................... 370/342; 370/335
(58) Field of Search .................................. 370/320, 335, 370/208, 209, 420, 441, 342, 348, 329, 913; 375/130, 140, 145, 149; 455/550, 561, 575, 567, 95

(56) References Cited

U.S. PATENT DOCUMENTS

| | | | |
|---|---|---|---|
| 5,151,919 A | | 9/1992 | Dent |
| 5,404,355 A | | 4/1995 | Raith |
| 5,430,760 A | | 7/1995 | Dent |
| 5,537,414 A | * | 7/1996 | Takiyasu et al. ............ 370/347 |
| 6,111,869 A | * | 8/2000 | Esmailzadeh et al. ...... 370/342 |
| 6,269,088 B1 | * | 7/2001 | Masui et al. ................. 370/335 |

OTHER PUBLICATIONS

Tobagi et al, Packet Switching in Radio Channels: Part III–Polling and (Dynamic) Split–Channel Reservation Multiple Access, IEEE, pp. 832–845, Aug. 1976.*

R. Esmalizadeh et al, Spread Spectrum Slot Reservation Multiple Access, IEEE (1996), pp. 1715–1719.

* cited by examiner

Primary Examiner—Frank Duong
(74) Attorney, Agent, or Firm—Mattingly, Stanger & Malur, P.C.

(57) ABSTRACT

In order to accomplish efficient communication of data between a base station and a plurality of mobile terminals, particular orthogonal codes are transmitted from the mobile stations to the base station as alert signals indicating the presence of data to be transmitted. The base station checks whether particular orthogonal codes are contained in the alert signals, and when the particular orthogonal codes are detected in the alert signals, information representing the detected orthogonal codes and the schedules for transmitting the data from the mobile terminals to the base station are transmitted from the base station to the mobile terminals as an alert response to the alert signals. When the information representing the orthogonal codes used for the alert signals are contained in the alert response transmitted from the base station to the mobile terminals, the data waiting to be transmitted is transmitted from the mobile terminals to the base station according the data transmission schedules in the alert response.

36 Claims, 10 Drawing Sheets

METHOD OF MOBILE COMMUNICATION AND APPARATUS THEREFOR

This application is a continuation of Ser. No. 08/907,088 filed Aug. 6, 1997 now U.S. Pat. No. 6,111,869.

FIELD OF THE INVENTION

The present invention relates to a method of mobile communication for transmitting and receiving data between a base station and a plurality of mobile terminals after having determined schedules for transmitting data, and to an apparatus therefor. Particularly, the invention relates to a method of mobile communication wherein, in transmitting a plurality of data packets from mobile terminals to the base station, the base station is informed that the data packets to be transmitted are present in the mobile terminals, and wherein the schedules for transmitting and receiving the data packets are determined and then the data packets are transmitted and received.

BACKGROUND OF THE INVENTION

In the prior art, a reservation-type mobile communication system has been proposed to transmit and receive data by radio communication between a base station and a plurality of mobile terminals after having reserved data channels for transmission and reception.

SUMMARY OF THE INVENTION

The present inventors have developed a system for overcoming the problems associated with the conventional system as discussed below. The above-mentioned conventional mobile communication system of the reservation type has been provided with a plurality of channels such as a preservation channel for transmitting and receiving a reservation packet, a response channel for transmitting and receiving a response packet for the reservation packet, and data channels for transmitting and receiving data, and wherein mobile terminals which wish to transmit the data use the reservation channel to transmit the reservation packet to the base station in order to let the base station know the presence of data that are to be transmitted.

The base station that has received the reservation packet from the mobile terminal assigns a data channel and a time slot which is a transmission timing that will be used by the mobile terminal, and transmits the assigned data channel and the time slot to the mobile terminal by using the response channel.

The mobile terminal that has received a response from the base station transmits data to the base station by using the assigned data channel and the time slot. The mobile terminal of the conventional transmission system of the reservation type transmits the data by using the data channel and the time slot assigned by the base station, and avoids the collision of data on the data channel even when the data are transmitted from a plurality of mobile terminals.

In the above-mentioned conventional mobile communication system of the reservation type, however, a plurality of reservation packets collide in the base station when the reservation packets are transmitted from a plurality of mobile terminals to the base station, and the contents of the reservation packets cannot be correctly read out in the base station. Therefore, the mobile terminals must transmit reservation packets again. In order to transmit the reservation package again as described above, waiting times are set in a random fashion so that the reservation packages will not collide again. When the reservation packets collide, the transmission efficiency of data greatly decreases.

Furthermore, in the above-mentioned conventional mobile communication system of the reservation type, data for making a reservation are transmitted and received in addition to the data that are to be transmitted. Therefore, a ratio of the data that are desired to be transmitted decreases in the whole data that are transmitted and received between the base station and the mobile terminals. When the consecutive data are to be transmitted being divided into a plurality of data packages in the above-mentioned conventional mobile communication system of the reservation type, in particular, a reservation packet is transmitted for the transmission of each data packet, and the packets occupy a large ratio in the whole data transmitted and received between the base station and the mobile terminal.

A mobile communication system of the reservation type applying a code division multiple access (CDMA) has been disclosed in an article to R. Esmailzadeh, N. Doi, H. Masui, Y. Ohgoshi and T. Yano, entitled "Spread Spectrum Slot Reservation Multiple Access", IEEE VTC, April 1996, Vol. 3, pp. 1715–1719. The outline of this system involves forming a plurality of reservation channels, response channels and data channels by using pseudo noise (PN) as a plurality of different dispersion codes, requesting the transmission of data through the plurality of reservation channels, and transmitting and receiving data by using a data channel designated by the response channel. According to the conventional mobile communication system of the reservation type using the above-mentioned CDMA, the contents of the reservation packets can be correctly read out by the base station even when a plurality of mobile terminals are transmitting reservation packets to the base station. A plurality of reservation packets received by the base station are partially overlap each other on the time axis, provided the timings deviate by more than a chip which is a minimum unit for constituting a PN signal among the reservation packets.

However, in the conventional mobile communication system of the reservation type using the above-mentioned CDMA, when the deviation of timing is not larger than a chip among the reservation packets that are partly overlapping one another, the contents of the reservation packets are not correctly read by the base station. Therefore, the mobile terminals must transmit the reservation packets again. Also, the data for making a reservation are transmitted and received in addition to the data that are to be transmitted. Therefore, the ratio of the data that are desired to be transmitted becomes low with respect to the entire amount of data transmitted and received between the base station and the mobile terminals.

The present inventors have studied the above-mentioned prior art and have found the following problems. First, in the above-mentioned conventional mobile communication system of the reservation type, it is not possible to read the contents of the reservation packets when the reservation packets simultaneously arrive at the base station from a plurality of mobile terminals. When the plurality of reservation packets collide, it becomes necessary to transmit the reservation packets again.

Second, reservation packets are transmitted for determining schedules for transmitting data. For this purpose, therefore, an output is necessary for transmitting the reservation packets in addition to an output for transmitting the data, and the communication capacity of data decreases by an amount corresponding to the electric power of transmitting the reservation packets.

An object of the present invention is to provide technology capable of efficiently transmitting and receiving data between the base station and a plurality of mobile terminals.

Another object of the present invention is to provide technology capable of detecting the individual alert signals even when a plurality of alert signals are transmitted from a plurality of mobile terminals to the base station.

Yet another object of the present invention is to provide technology capable of maintaining, at a low level, the value of the alert signals transmitted from the mobile terminals.

The following are representative examples of methods and apparatuses which realize the above-mentioned and other objects of the present invention.

(1) A method of mobile communication includes determining schedules for transmitting and receiving data, and transmitting and receiving data between a base station and a plurality of mobile terminals according to the schedules. Particular orthogonal codes are transmitted from mobile stations to the base station as alert signals indicating the presence of data to be transmitted. The base station checks whether particular orthogonal codes are contained in the alert signals transmitted from the mobile terminals to the base station. When the particular orthogonal codes are detected in the alert signals transmitted from the mobile stations to the base station, data representing the detected orthogonal codes and the schedules for transmitting the data from the mobile terminals to the base station are transmitted from the base station to the mobile terminals as an alert response in response to the alert signals. When the data representing the orthogonal codes used for the alert signals transmitted from the mobile terminals to the base station are contained in the alert response transmitted from the base station to the mobile terminals, the data transmission schedules in the alert response are read out at the mobile terminals and the data are transmitted from the mobile terminals to the base station according the schedules that are read out.

When the data are to be transmitted and received between the base station and the mobile terminals according to the above-mentioned mobile communication method, mobile terminals which intend to transmit data select and generate particular orthogonal codes out of a plurality of orthogonal codes, and transmit these generated orthogonal codes to the base station as alert signals indicating the presence of data that are to be transmitted. Here, the orthogonal codes transmitted as alert signals from the mobile terminals to the base station are such codes that the inner products of the same codes assume particular values but the inner products of different codes assume a value of zero.

The base station that has received the alert signals generates orthogonal codes and checks whether these generated orthogonal codes are contained in the alert signals transmitted from the mobile terminals to the base station. When the orthogonal codes generated by the base station are detected in the alert signals transmitted from the mobile terminals to the base station, the base station that has received the alert signals determines schedules for transmitting the data from the mobile terminals to the base station. Then the base station transmits, to the mobile terminals, the data representing the detected orthogonal codes and the determined schedules for transmitting data from the mobile terminals to the base station as an alert response to the alert signals.

Upon receiving the alert response, the mobile terminals compare the orthogonal codes transmitted from the mobile terminals to the base station with orthogonal codes represented by the data stored in the alert response, and check if the data representing the orthogonal codes used in the alert signals transmitted from the mobile terminals to the base station are contained in the alert response transmitted from the base station to the mobile terminals. When the data representing the orthogonal codes used by a mobile terminal as its alert signal are contained in the alert response from the base station, the data transmission schedules in the alert response are read out by the mobile terminal, and the data are transmitted from the mobile terminal to the base station according to the schedules that are read out.

According to the mobile communication method as described above, the data are transmitted and received after the schedules are determined by alert signals of orthogonal codes. Therefore, an efficient communication of data can be accomplished between the base station and the plurality of mobile terminals.

(2) In the mobile communication method described in (1) above, the alert signals transmitted from the mobile terminals to the base station are multiplied by each of a plurality of orthogonal codes generated in the base station in order to check whether particular orthogonal codes are contained in the alert signals. The base station generates a plurality of orthogonal codes upon receiving alert signals from the mobile terminals, multiplies the alert signals transmitted from the mobile terminals to the base station by each of a plurality of orthogonal codes generated by the base station, and detects orthogonal codes in the alert signals that are received based upon the results of multiplication.

When a plurality of mobile terminals simultaneously transmit alert signals to the base station, a plurality of orthogonal codes are contained in the alert signals received by the base station. Here, however, the inner products of the same orthogonal codes assume particular values and the inner products of different orthogonal codes assume a value of zero. Therefore, the alert signals containing a plurality of orthogonal codes are multiplied by each of a plurality of orthogonal codes generated by the base station, and the results of multiplication are checked for each of the orthogonal codes. Even when the plurality of orthogonal codes are contained in the alert signals, therefore, it is possible to check if particular orthogonal codes are contained.

According to the mobile communication method as described above, the results of multiplication of the same orthogonal codes assume particular values and the results of multiplication of different orthogonal codes assume a value of zero. This makes it possible to detect the individual alert signals even when the plurality of alert signals are transmitted from a plurality of mobile terminals to the base station.

(3) In the mobile communication method described in (2) above, the results of multiplication of the alert signals transmitted from the mobile terminals to the base station and the orthogonal codes generated in the base station, are accumulated for each of a plurality of bit periods constituting the orthogonal codes in order to check whether particular orthogonal codes are contained in the alert signals. Upon receiving alert signals from the mobile terminals, the base station multiplies the alert signals transmitted from the mobile terminals to the base station by orthogonal codes generated by the base station, and accumulates the results of the multiplication for each of a plurality of bit periods constituting the orthogonal codes. When the inner products of the orthogonal codes in the alert signals that are received and the orthogonal codes generated by the base station are accumulated for each of a plurality of bit periods, the noise component in each bit period is canceled and the S/N ratio of the alert signals is improved. Therefore, it becomes possible to maintain the output value of the alert signals transmitted from the mobile terminals at a low level. This saves the output of the alert channel for transmitting the alert signals and increases the number of data channels.

According to the mobile communication method as described above, reception of the alert signals is detected by accumulating the orthogonal codes for a plurality of bit periods, making it possible to maintain the output value of the alert signals transmitted from the mobile terminals at a low level.

(4) An apparatus used for mobile communication according to a method involving determining schedules for transmitting and receiving data, and transmitting and receiving data between a base station and a plurality of mobile terminals according to the schedules, includes an alert signal transmission means for transmitting particular orthogonal codes from mobile terminals to the base station as alert signals indicating the presence of data to be transmitted. The apparatus also includes an alert signal reception means for checking in the base station whether particular orthogonal codes are contained in the alert signals transmitted from the mobile terminals to the base station. An alert response transmission means is provided which, when the particular orthogonal codes are detected in the alert signals transmitted from the mobile terminals to the base station, transmits, from the base station to the mobile terminals, data representing the detected orthogonal codes and the schedules for transmitting the data from the mobile terminals to the base station as an alert response to the alert signals. Finally, an alert response reception means is provided which, when the data representing the orthogonal codes used for the alert signals transmitted from the mobile terminals to the base station are contained in the alert response transmitted from the base station to the mobile terminals, reads out at the mobile terminals the data transmission schedules in the alert response.

When the data are to be transmitted and received between the base station and the mobile terminals according to the above-mentioned mobile communication apparatus, mobile terminals which intend to transmit data select and generate particular orthogonal codes out of a plurality of orthogonal codes, and transmit these generated orthogonal codes to the base station as alert signals indicating the presence of data for transmitting the above generated orthogonal codes. In the base station which has received the alert signals, the alert signal reception means generates orthogonal codes and checks if the above generated orthogonal codes are contained in the alert signals that are transmitted from the mobile terminals to the base station. When the orthogonal codes generated by the base station are detected in the alert signals transmitted from the mobile terminals to the base station, the alert response transmission means in the base station that has received the alert signals determines schedules for transmitting data from the mobile terminals to the base station, and transmits, from the base station to the mobile terminals, the data representing the detected orthogonal codes and the determined schedules for transmitting data from the mobile terminals to the base station as an alert response to the alert signals.

In the mobile terminals that have received the alert response, the alert response reception means compares the orthogonal codes transmitted from the mobile terminals to the base station with orthogonal codes represented by the data stored in the alert response, and checks if the data representing the orthogonal codes used in the alert signals transmitted from the mobile terminals to the base station are contained in the alert response transmitted from the base station to the mobile terminals. When the data representing the orthogonal codes used by the mobile terminals as alert signals are contained in the alert response from the base station, the data transmission schedules in the alert response are read out by the mobile terminals, and the data are transmitted from the mobile terminals to the base station according to the schedules that are read out.

According to the mobile communication apparatus as described above, the data are transmitted and received after the schedules are determined by alert signals which use orthogonal codes. Therefore, an efficient communication of data can be accomplished between the base station and the mobile terminals.

(5) In an apparatus for mobile communication described in (4) above, the alert signal reception means is provided with a multiplication means for multiplying the alert signals transmitted from the mobile terminals to the base station by each of a plurality of orthogonal codes generated in the base station. When the base station in the above-mentioned mobile communication apparatus receives alert signals from the mobile terminals, the alert signal reception means generates a plurality of orthogonal codes, and the multiplication means multiplies the alert signals transmitted from the mobile terminals to the base station by each of a plurality of orthogonal codes generated by the base station, in order to detect orthogonal codes in the alert signals that are received based upon the results of multiplication. When a plurality of mobile terminals simultaneously transmit alert signals to the base station, a plurality of orthogonal codes are contained in the alert signals received by the base station. Here, however, the inner products of the same orthogonal codes assumes particular values and the inner products of different orthogonal codes assume a value of zero. Therefore, the alert signals containing a plurality of orthogonal codes are multiplied by each of a plurality of orthogonal codes generated by the base station, and the results of multiplication are checked for each of the orthogonal codes. Even when the plurality of orthogonal codes are contained in the alert signals, therefore, it is possible to check if particular orthogonal codes are contained.

According to the mobile communication apparatus as described above, the results of multiplication of the same orthogonal codes assume particular values and the results of multiplication of different orthogonal codes assume a value of zero. This makes it possible to detect the individual alert signals even when the alert signals are transmitted from the mobile terminals to the base station.

(6) In the mobile communication apparatus described in (5) above, the alert signal reception means is provided with an accumulation means for accumulating the results of multiplication of the alert signals transmitted from the mobile terminals to the base station and the orthogonal codes generated in the base station for each of a plurality of bit periods constituting the orthogonal codes. When the base station receives alert signals from the mobile terminals, the alert signal reception means multiplies the alert signals transmitted from the mobile terminals to the base station by orthogonal codes generated by the base station, and the accumulation means accumulates the results of multiplication for each of a plurality of bit periods constituting the orthogonal codes. When the inner products of the orthogonal codes in the alert signals that are received and the orthogonal codes generated by the base station are accumulated for each of a plurality of bit periods constituting the orthogonal codes, the noise component in each bit period is canceled and the S/N ratio of the alert signals is improved. Therefore, it becomes possible to maintain the output value of the alert signals transmitted from the mobile terminals in the mobile communication apparatus at a low level. This saves the output of the alert channel for transmitting the alert signals and increases the number of data channels.

According to the mobile communication apparatus as described above, reception of the alert signals is detected by accumulating the orthogonal codes for a plurality of bit periods, making it possible to maintain the output value of the alert signals transmitted from the mobile terminals at a low level.

These and other objects, features and advantages of the present invention will become more apparent in view of the following detailed description of the preferred embodiments in conjunction with the accompanying drawings.

DETAILED DESCRIPTION OF THE PREFERRED EMBODIMENT

The following detailed description of the preferred embodiments is undertaken in connection with the drawings.

A mobile communication method and an apparatus therefor according to an embodiment of the present invention will now be described in which alert signals representing requests of transmission are transmitted from a plurality of mobile terminals to a base station to determine transmission schedules. Then, data packets are transmitted and received by radio communication between the base station and the plurality of mobile terminals.

Figure 1:
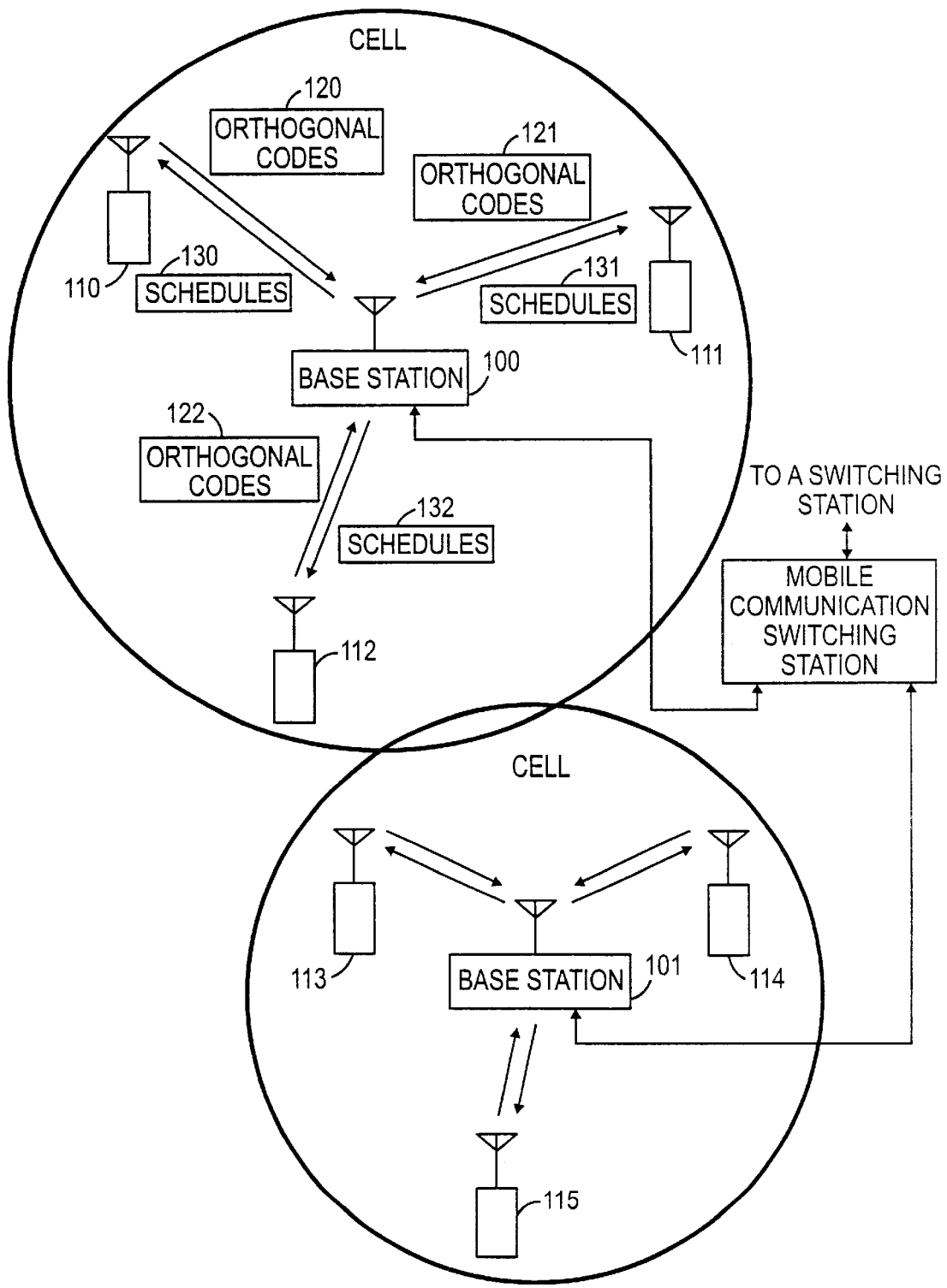
FIG. 1 illustrates a mobile communication apparatus according to a disclosed embodiment of the present invention.

FIG. 1 illustrates a mobile communication apparatus having base stations 100 and 101, mobile terminals 110 to 115, requests for transmission 120 to 122, and transmission schedules 130 to 132. Base station 100 is connected to the mobile terminals 110 to 112 over radio communication channels, and communication is maintained between the base station 100 and the mobile terminals 110 to 112 within a particular cell which is a communication area of the base station 100. The base station 100 and the mobile terminals 110 to 112 in the mobile communication apparatus communicate with the mobile terminals 113 to 115 in the communication area of the base station 101 through a mobile communication switching station, or with public circuits through the mobile communication switching station.

Mobile terminals 110 to 112, which intend to transmit data packets, transmit orthogonal codes as requests for transmission 120–122 to the base station 100 to let the base station 100 know that data packets that are to be transmitted are present in the mobile terminals 110 to 112. The base station 100 that has received the requests for transmission 120–122 from the mobile terminals 110 to 112 forms transmission schedules 130 to 132 by determining time slots and data channels used by the mobile terminals 110 to 112, and sends these formed transmission schedules 130 to 132 to the mobile terminals 110 to 112. The mobile terminals 110 to 112 that have received transmission schedules 130 to 132 from the base station 100 transmit data packets according to the time slots and data channels indicated by the transmission schedules 130 to 132 that are received.

Figure 2:
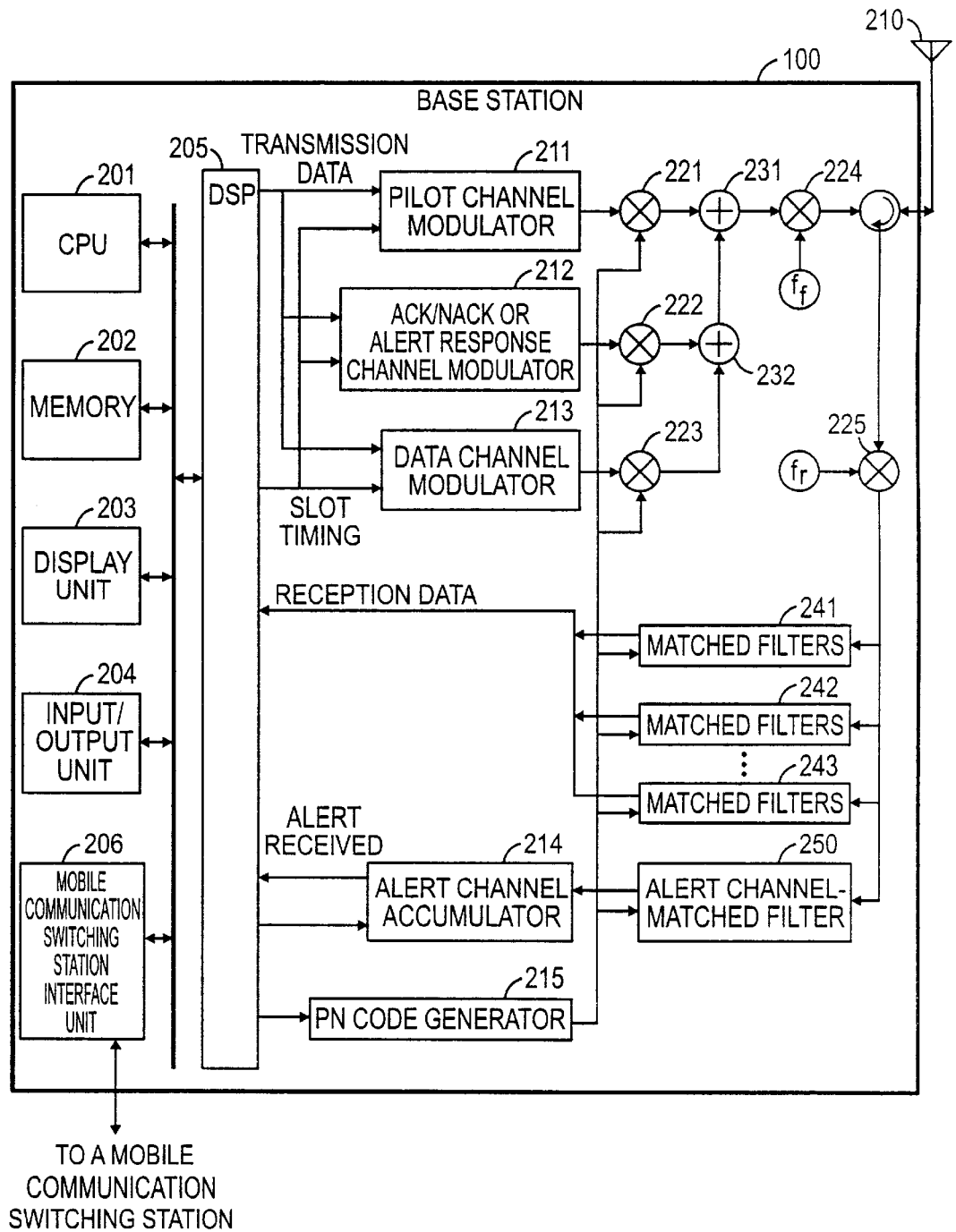
FIG. 2 is illustrates a base station 100 in the mobile communication apparatus according to the disclosed embodiment.

FIG. 2 illustrates base station 100 in the mobile communication apparatus in more detail. Base station 100 includes CPU 201, memory 202, display unit 203, input/output unit 204, DSP 205, mobile communication switching station interface unit 206, antenna 210, pilot channel modulator 211, ACK/NACK or alert response channel modulator 212, data channel modulator 213, alert channel accumulator 214, PN code generator 215, multipliers 221 to 225, adders 231 and 232, data channel-matched filters 241 to 243, and alert channel-matched filter 250.

CPU 201 controls the operation of the base station 100. Memory 202 stores a control program for controlling the operation of the base station 100. Display unit 203 displays the operating condition of the base station 100. Input/output unit 204 processes the input and output of operation instructions to and from the base station 100. DSP 205 controls the communications to mobile terminals 110 to 112. The mobile communication switching station interface unit 206 provides connection to the mobile communication switching station. All of these elements are interconnected as shown in the FIG. 2.

Base station 100 communicates to mobile terminals 110 to 112 using code division multiple access (CDMA). Provided between the base station 100 and mobile terminals 110 to 112 are a pilot channel, an ACK/NACK or alert response channel, an alert channel and a plurality of data channels. Connected to the DSP 205 of the base station 100 are the following: the pilot channel modulator 211, ACK/NACK or alert response channel modulator 212, data channel modulator 213, alert channel accumulator 214, PN code generator 215, and data channel-matched filters 241 to 243. The pilot channel modulator 211 modulates the pilot channels for transmitting pilot signals that are received by the mobile terminals 110 to 112. The ACK/NACK or alert response channel modulator 212 modulates ACK/NACK or alert response channel for transmitting ACK/NACK which indicates success/failure of the reception of data packets from the mobile terminals 110 to 112 as well as alert response to the alert signals received from the mobile terminals 110 to 112. The ACK/NACK or alert response channel modulator 212 corresponds to the alert response transmission means which, when particular orthogonal codes are detected in the alert signals transmitted from the mobile terminals 110 to 112 to the base station 100, transmits, from the base station 100 to the mobile terminals 110 to 112, the data representing the above detected orthogonal codes and schedules for transmitting data packets from the mobile terminals 110 to 112 to the base station 100 as an alert response.

The data channel modulator 213 modulates a plurality of data channels for transmitting data packets received from the mobile terminals 110 to 112. The alert channel accumulator 214 accumulates signals of alert channels received through the alert channel-matched filter 250, and corresponds to the alert signal reception means which checks whether particular orthogonal codes are contained in the alert signals transmitted from the mobile terminals 110–112 to the base station 100. The PN code generator 215 generates a PN code which differs depending upon the pilot channel, alert channel, ACK/NACK or alert response channel and data channels. The data channel-matched filters 241 to 243 take out transmission data in agreement with the PN codes of a plurality of data channels.

A pilot signal modulated by the pilot channel modulator 211 and a PN code for pilot channel generated by the PN code generator 215 are multiplied by the multiplier 221, passed through the adder 231 and the multiplier 224, and are transmitted as pilot signals to the mobile terminals 110 to 112 from an antenna 210 at a down carrier frequency ff. Similarly, the ACK/NACK or alert response modulated by the ACK/NACK or alert response channel modulator 212, data packets modulated by the data channel modulator 213, and a PN code for ACK/NACK or alert response channel and a PN code for a data channel generated by the PN code generator 215, are multiplied through the multipliers 222 and 223, passed through the adders 231, 232 and the multiplier 224, and are transmitted to the mobile terminals 110 to 112 from the antenna 210 at a down carrier frequency ff.

The signals transmitted from the mobile terminals 110 to 112 at an up carrier frequency $f_r$ and received by the antenna 210, are separated into signals of the data channels and signals of the alert channel by PN codes for data channels and a PN code for the alert channel generated by the PN code generator 215, the data channel-matched filters 241–243 and the alert channel-matched filter 250. Then, the signals of the data channels are input into the DSP 205 and the signals of the alert channel are input into the alert channel accumulator 214.

Figure 3:
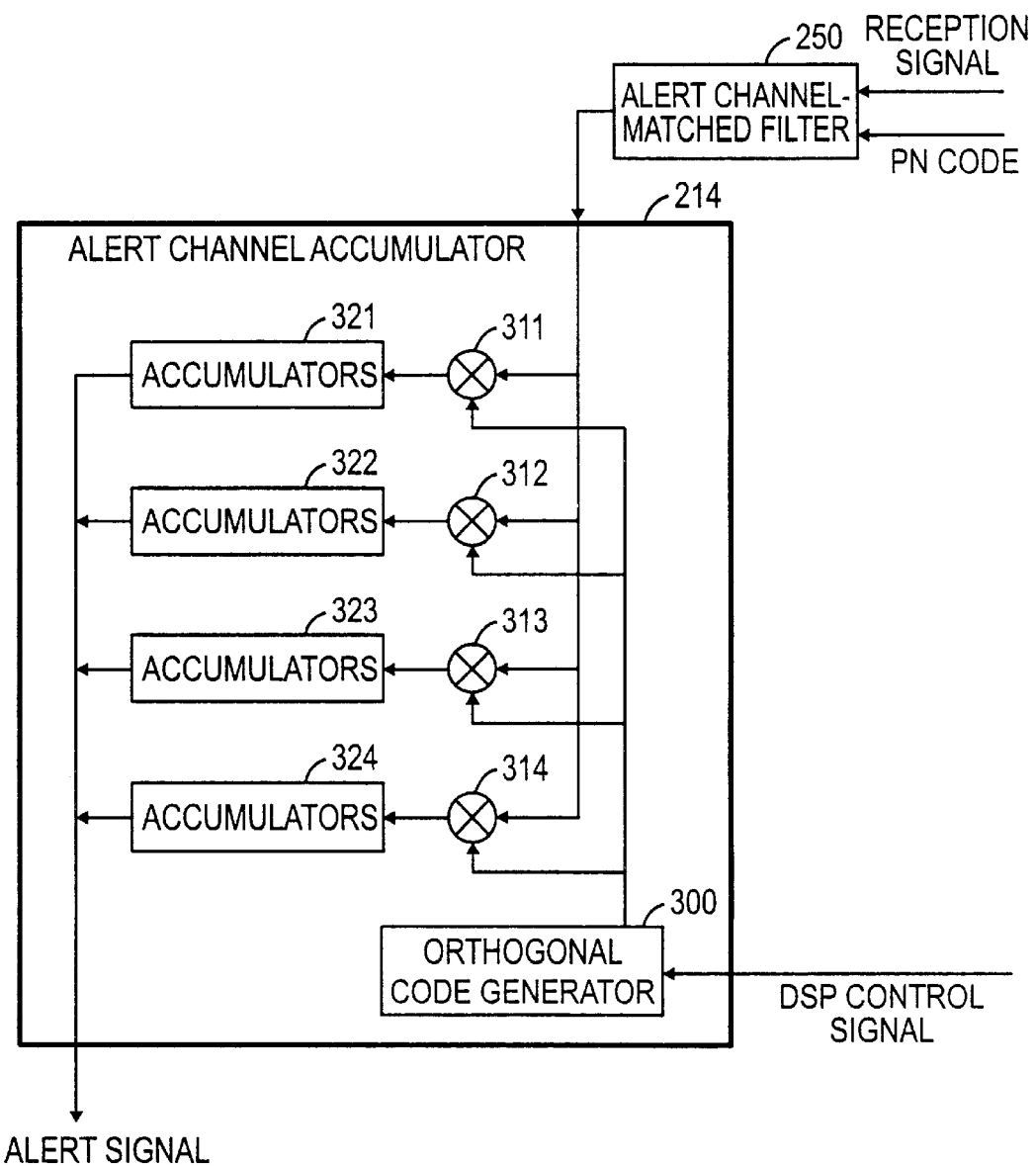
FIG. 3 illustrates an alert channel accumulator 214 in the base station 100 in the mobile communication apparatus according to the disclosed embodiment.

FIG. 3 illustrates the alert channel accumulator 214 in more detail. Alert channel accumulator 214 includes the orthogonal code generator 300, multipliers 311 to 314, and accumulators 321 to 324. The orthogonal code generator 300, which generates a plurality of orthogonal codes, is connected to the multipliers 311 to 314. Signals obtained by multiplying signals of the alert channel from the alert channel-matched filter 250 and the orthogonal codes are accumulated by the accumulators 321 to 324 to detect alert signals. The orthogonal code generator generates orthogonal codes that are identical to orthogonal codes generated by the mobile terminals 110 to 112, and inputs a different orthogonal code into each of the multipliers 311 to 314. The multipliers 311 to 314 multiply the signals input from the alert channel-matched filter 250 by the orthogonal codes from the orthogonal code generator 300, and input them to the accumulators 321 to 324. The accumulators 321 to 324 accumulate the outputs of the multipliers 311 to 314 for each particular bit period in order to detect if there are received alert signals in agreement with particular orthogonal codes. The signals of the alert channel input through the alert channel-matched filter 250 are multiplied by a plurality of different orthogonal codes generated by the orthogonal code generator 300 through the multipliers 311 to 314, and the multiplied results are accumulated by the accumulators 321 to 324.

Figure 4:
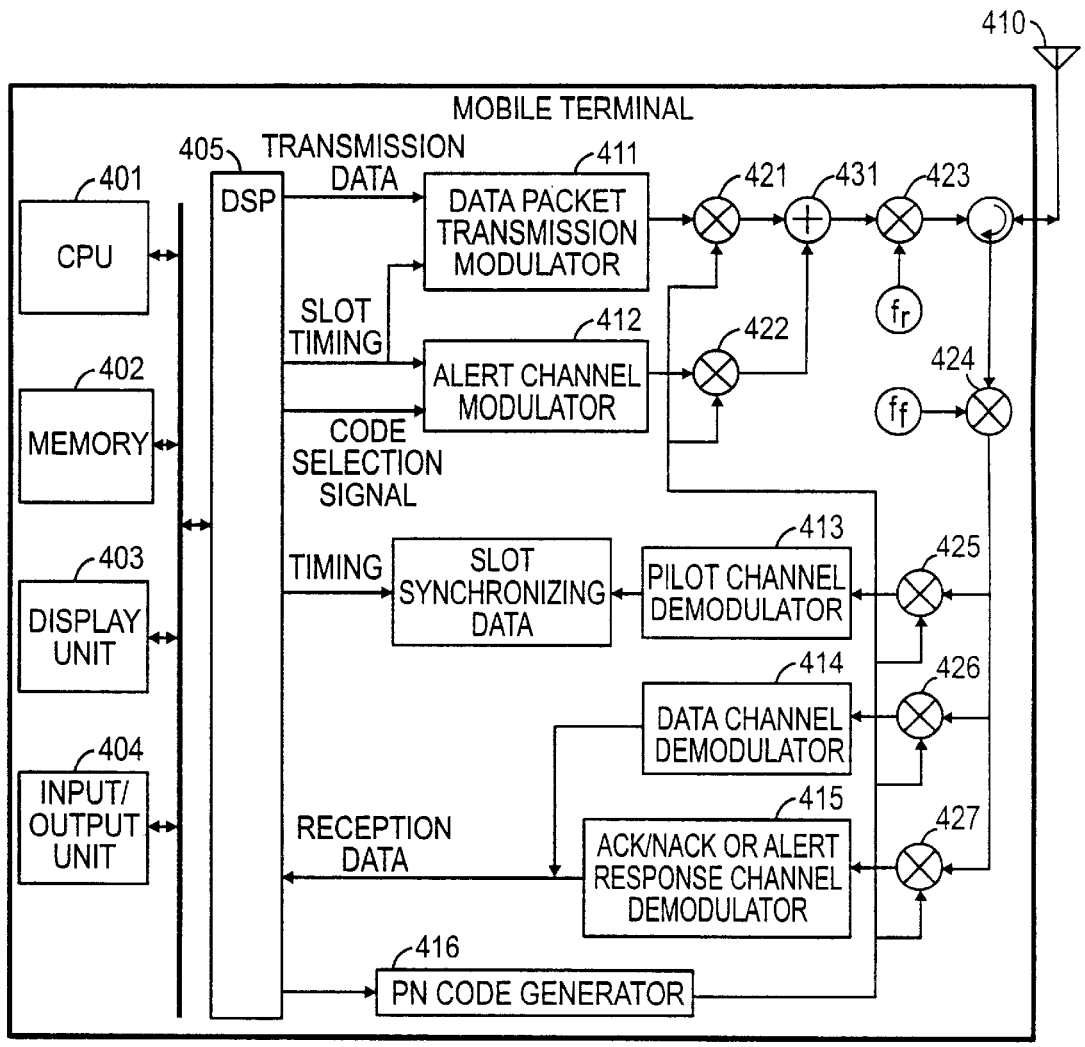
FIG. 4 illustrates mobile terminals 110 to 112 in the base station 100 in the mobile communication apparatus according to the disclosed embodiment.

FIG. 4 illustrates mobile terminals 110 to 112 in more detail. A CPU 401 controls the operation of the mobile terminal. Memory 402 stores a control program. Display unit 403 displays the operation condition. Input/output unit 404 inputs and outputs the data to be transmitted and received. DSP 405 controls communication to the base station 100. These elements are interconnected in the manner illustrated in FIG. 4. Connected to DSP 405 are the data packet transmission modulator 411, alert channel modulator 412, pilot channel demodulator 413, data channel demodulator 414, ACK/NACK or alert response channel demodulator 415 and PN code generator 416. The data packet transmission modulator 411 modulates the data packets that are to be transmitted to the base station 100. The alert channel modulator 412 generates an orthogonal code as an alert signal for informing the base station 100 of the presence of data packets to be transmitted, and modulates it. The alert channel modulator 412 corresponds to the alert signal transmission means which transmits, from the mobile terminals 110–112 to the base station 100, the particular orthogonal codes as alert signals indicating the presence of data packets to be transmitted.

The pilot channel demodulator 413 demodulates the pilot signals transmitted from the base station 100 over pilot channels. The data channel demodulator 414 demodulates the data packets transmitted from the base station 100 over the data channels. The ACK/NACK or alert response channel demodulator 415 demodulates the ACK/NACK or alert response transmitted from the base station 100 over the ACK/NACK or alert response channel, and corresponds to the alert response reception means which reads the data packet schedules in the alert responses in the mobile terminals 110 to 112 when the data representing orthogonal codes used for the alert signals transmitted from the mobile terminals 110–112 to the base station 100 are contained in the alert responses transmitted from the base station to the mobile terminals 110–112. The PN code generator 416 generates a PN code which differs depending upon the pilot channel, alert channel, ACK/NACK or alert response channel and data channels.

In the mobile terminals 110 to 112, a data packet signal modulated by the data packet transmission modulator 411 is multiplied by a PN code for data channel generated by the PN code generator 416 through the multiplier 421, passed through the adder 431 and the multiplier 423, and is transmitted to the base station 100 from an antenna 410 at an up carrier frequency $f_r$. Similarly, an alert signal modulated by the alert channel modulator 412 is multiplied by a PN code for the alert channel generated by the PN code generator 416 through the multiplier 422, passed through the adder 431 and the multiplier 423, and is transmitted to the base station 100 from the antenna 410 at the up carrier frequency $f_r$.

As the mobile terminals 110 to 112 receive, through antenna 410, a signal transmitted from the base station 100 at the down carrier frequency $f_f$, the multiplier 425 multiplies this received signal by the PN code for the pilot channel generated by the PN code generator 416, the pilot channel demodulator 413 demodulates the pilot signal, and the slot synchronizing data is input to the DSP 405. Similarly, a multiplier 426 multiplies a signal transmitted from the base station 100 at the down carrier frequency $f_f$ by a PN code for the data channel generated by the PN code generator 416, and the data packet signal is demodulated by the data channel demodulator 414 and is input to the DSP 405. Furthermore, a signal transmitted from the base station 100 at the down carrier frequency $f_f$ is multiplied by a PN code for the ACK/NACK or alert response channel generated by the PN code generator 416 through the multiplier 427, and the ACK/NACK or alert response is demodulated by the ACK/NACK or alert response channel demodulator 415 and is input to the DSP 405.

Figure 5:
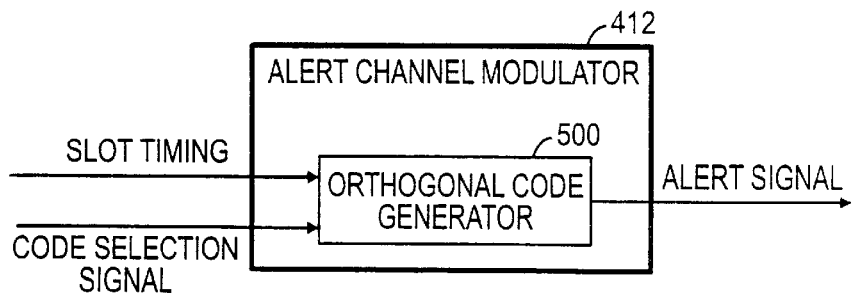
FIG. 5 illustrates an alert channel modulator 412 in the mobile terminals 110 to 112 in the mobile communication apparatus according to the disclosed embodiment.

FIG. 5 illustrates the alert channel modulator 412 of the mobile terminals 110 to 112 in more detail, namely, including orthogonal code generator 500. The alert channel modulator 412 selects and generates a particular orthogonal code by using the orthogonal code generator 500 and outputs this generated orthogonal code as an alert signal. The orthogonal code generator 500 selects any orthogonal code out of a plurality of orthogonal codes stored in the table depending upon a code selection signal and outputs it as the alert signal. The orthogonal code generator 500 may be a code generator which selects a predetermined orthogonal code and generates it for each of the mobile terminals. The orthogonal codes generated by the orthogonal code generator 500 are multiplied as alert signals by the PN code for the alert channel through the multiplier 422, and are transmitted to the base station 100.

Figure 6:
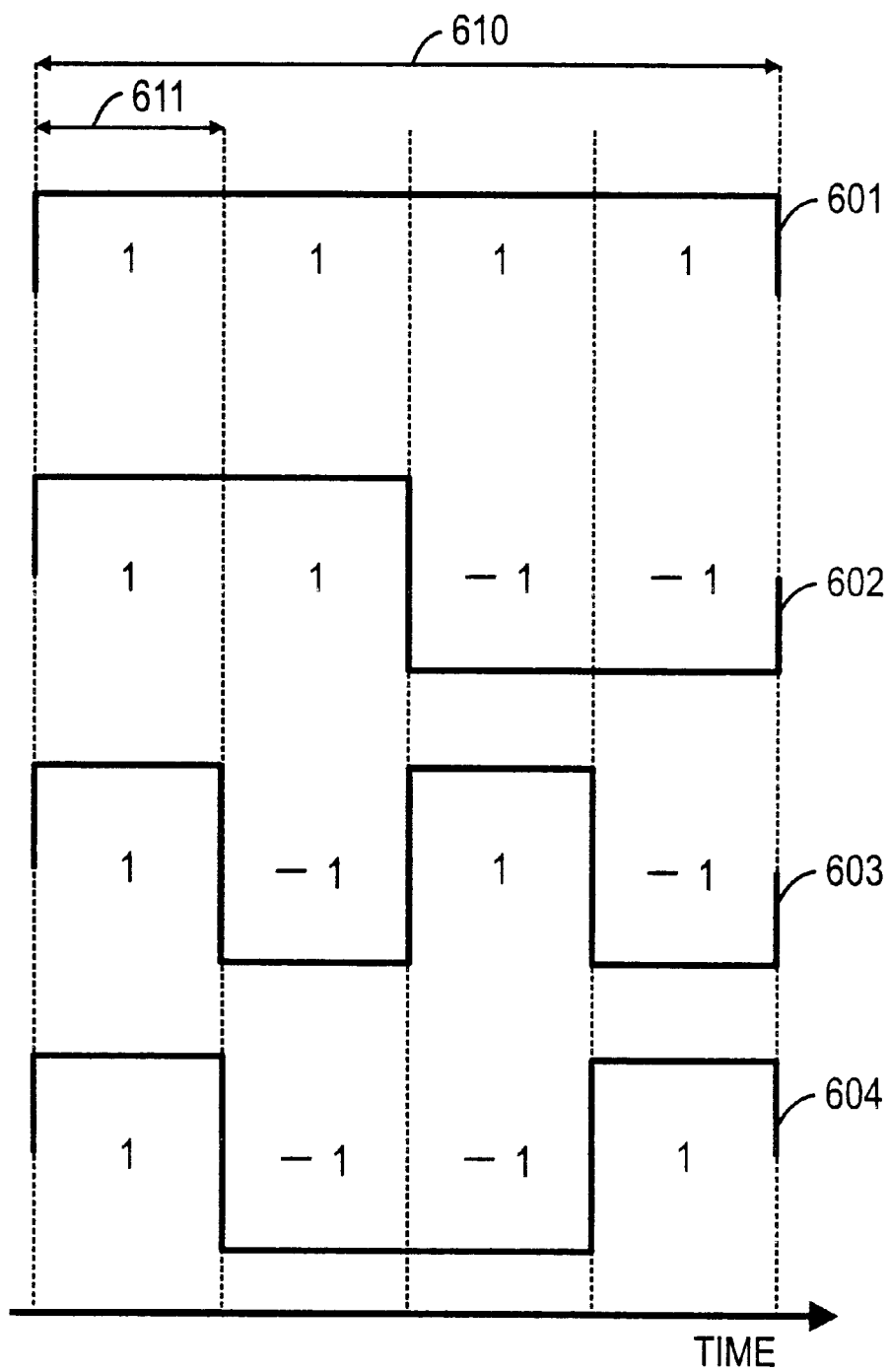
FIG. 6 illustrates orthogonal codes used in the mobile communication apparatus according to the first embodiment.

FIG. 6 illustrates orthogonal codes in the mobile communication apparatus which have an orthogonal code period 610 and a bit period 611. The orthogonal codes 601 to 604 use four bit periods 611 as an orthogonal code period 610. When the inner product of the same orthogonal codes is accumulated for each bit period 611, the result of accumulation becomes "4". When the inner product of any two different orthogonal codes is accumulated for each bit period 611, the result of accumulation becomes "0".

In the alert channel accumulator 214 of the base station 100 of FIG. 3, when the alert channel signal input through the alert channel-matched filter 250 includes a particular code that is in agreement with the orthogonal codes 601 to 604 generated by the orthogonal code generator 300, a particular output value is obtained by a particular accumulator in the accumulators 321 to 324 to which the orthogonal codes 601 to 604 are input through the multipliers 311 to 314, and it is detected that the alert signals are being transmitted from the mobile terminals 110 to 112. When the alert channel signal input through the alert channel-matched filter 250 contains a plurality of codes that are in agreement with the orthogonal codes 601 to 604 generated by the orthogonal code generator 300, the result of accumulation of inner products of different orthogonal codes becomes zero. Therefore, particular output values are obtained by a plurality of particular accumulators among the accumulators 321 to 324 to which the orthogonal codes 601 to 604 are input through the multipliers 311 to 314, and it is detected that a plurality of alert signals are being transmitted from the mobile terminals 110 to 112.

On the other hand, when the inner products of the alert channel signals input through the alert channel-matched filter 250 and the orthogonal codes 601 to 604 are accumulated for each of a plurality of bit periods 611, the noise component is canceled in each bit period 611, and the S/N ratio of the alert channels is improved. When the codes of, for example, 32 bits are used as orthogonal codes 601 to 604, the accumulation is effected for each of 32 bit periods 611 and a gain of about 15 dB is obtained. It is therefore allowed to decrease the output of the alert channel for transmitting alert signals of the side of mobile terminals 110 to 112 and, hence, to increase the number of data channels for transmitting and receiving data packets.

Described below is a schedule response operation for transmitting alert signals from the mobile terminals 110–112 to the base station 100 and for transmitting the data packets from the base station 100 to the mobile terminals 110–112 in the mobile communication apparatus of the present invention.

Figure 7:
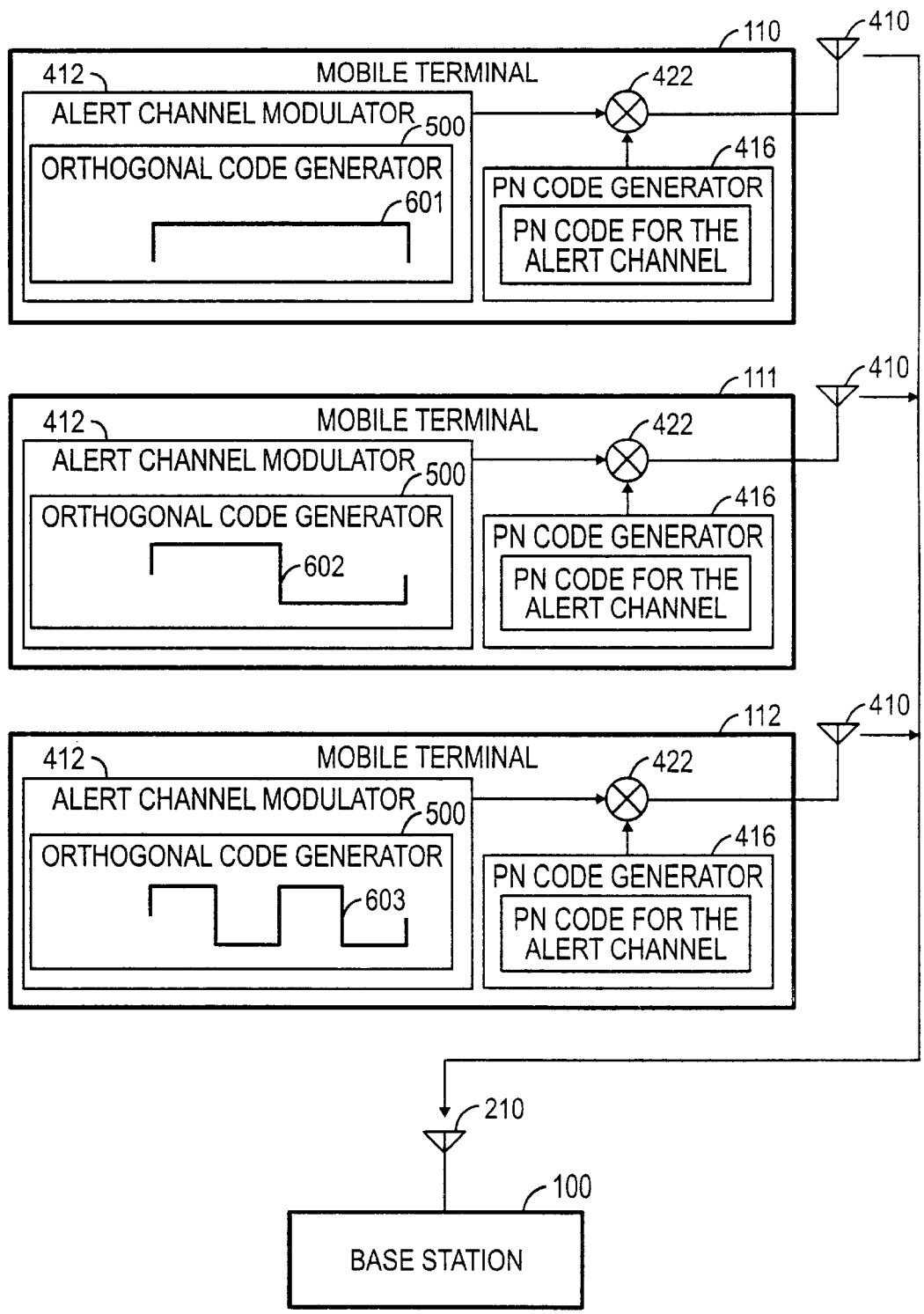
FIG. 7 illustrates the outline of the alert signal transmission operation in the mobile communication apparatus according to the disclosed embodiment.

FIG. 7 illustrates the operation for transmitting alert signals in the mobile communication apparatus of this embodiment. Different orthogonal codes 601 to 603 are generated by the mobile terminals 110 to 112, and alert signals are transmitted to the base station 100. Mobile terminal 110, which intends to transmit data packets, generates an orthogonal code 601 through the orthogonal code generator 500 in the alert channel modulator 412, the multiplier 422 multiplies this generated orthogonal code 601 by a PN code for the alert channel generated by the PN code generator 416, and the orthogonal code 601 is transmitted as an alert signal to the base station 100 from the antenna 410. Similarly, mobile terminal 111 multiplies the orthogonal code 602 by the PN code for the alert channel and sends the orthogonal code 602 as an alert signal to the base station 100. Mobile terminal 112 multiplies the orthogonal code 603 by the PN code for the alert channel and transmits the orthogonal code 603 as an alert signal to the base station 100. The orthogonal codes 601 to 603 output by the alert channel modulator 412 in the mobile terminals 110 to 112 may be any code selected by the orthogonal code generator 500 of the alert channel modulator 412 or may be a particular code determined in advance for each of the mobile terminals 110 to 112.

Figure 8:
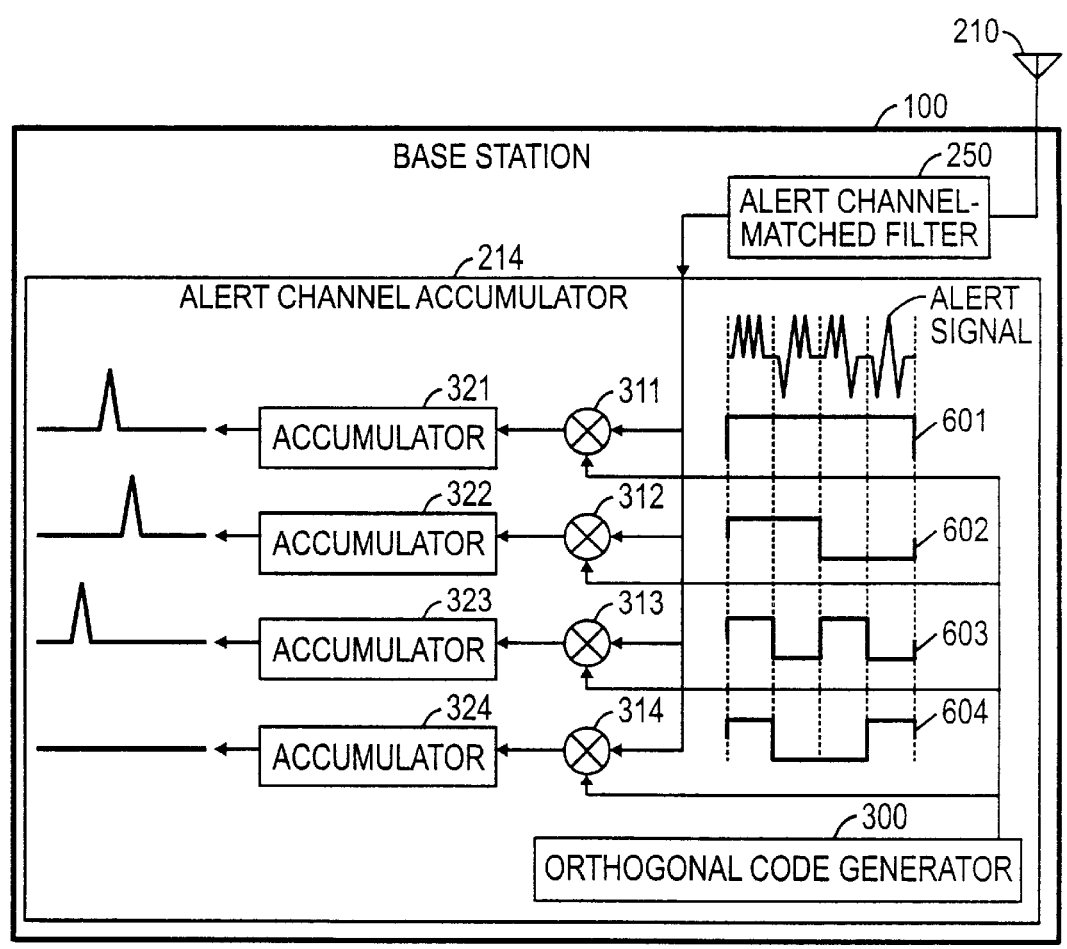
FIG. 8 illustrates the outline of the alert signal reception operation in the mobile communication apparatus according to the disclosed embodiment.

FIG. 8 illustrates the alert signal reception operation in the mobile communication apparatus of the present invention. A plurality of alert signals transmitted from the mobile terminals 110 to 112 are received by the base station 100. When a plurality of alert signals transmitted from the mobile terminals 110–112 are received by the antenna 210, the received alert signals are input to the alert channel accumulator 214 through the alert channel-matched filter 250. In the alert channel accumulator 214, the received alert signals are input to the multipliers 311 to 314, the orthogonal codes 601 to 604 are generated by the orthogonal code generator 300 and are input to the multipliers 311 to 314, and the inner products of the received alert signals and the orthogonal codes 601 to 604 are input to the accumulators 321 to 324. In other words, the received alert signal is multiplied by the orthogonal code 601 through the multiplier 311 and the result of multiplication is input to the accumulator 321. Similarly, the inner product of the alert signal and the orthogonal code 602 is input to the accumulator 322, the inner product of the alert signal and the orthogonal code 603 is input to the accumulator 323, and the inner product of the alert signal and the orthogonal code 604 is input to the accumulator 324.

Next, the accumulators 321 to 324 in the alert channel accumulator 214 accumulate the results of accumulation for each bit period 611 and output the results of accumulation. The results of accumulation of the accumulators 321 to 324 assume particular values when the received alert signals contain an alert signal formed by the orthogonal codes which are the same as the orthogonal codes 601 to 604 generated by the orthogonal code generator 300. Therefore, when the orthogonal codes 601 to 603 are transmitted as alert signals from the mobile terminals 110 to 112 as described above, the accumulators 321 to 323 output particular values as results of accumulation, and the output of the accumulator 324 becomes zero.

Figure 9:
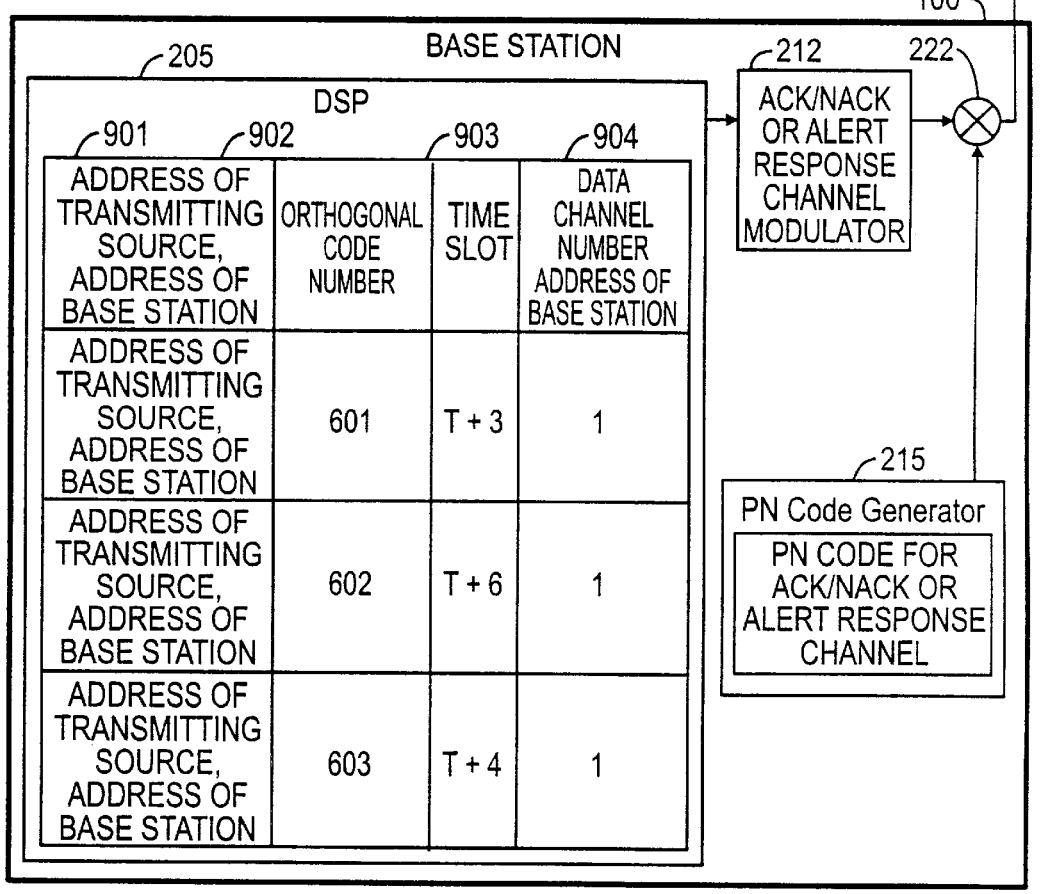
FIG. 9 illustrates a response of transmission schedule in the mobile communication apparatus according to the disclosed embodiment.

FIG. 9 illustrates a response of transmission schedule in the mobile communication apparatus of the present invention. As shown in FIG. 9, the transmission schedule which is a response in the mobile transmission apparatus of this embodiment includes the address 901 of the transmitting source, orthogonal code numbers 902, time slots 903 and data channel numbers 904. The transmission schedule is the one when the address 901 of the transmitting source representing the address of the base station 100, orthogonal code number 902 which is the data representing the detected orthogonal code, time slot 903 by which the mobile terminal transmits data packets, and data channel number 904 by which the mobile terminal transmits data packets, responded to by the mobile terminals 110 to 112 by using the ACK/NACK or alert response channel.

Here, the time slot 903 "t+3", of FIG. 9, represents a third slot from the head of the slot synchronizing data indicated by a pilot signal. In the base station 100, upon detecting the alert signals containing the orthogonal codes 601 to 603, the alert channel accumulator 214 sets a plurality of time slots 903 and data channel numbers 904 used by the mobile terminals 110–112 that have transmitted the orthogonal codes 601 to 603, and successively transmits them as alert response to the mobile terminals 110 to 112.

Figure 10:
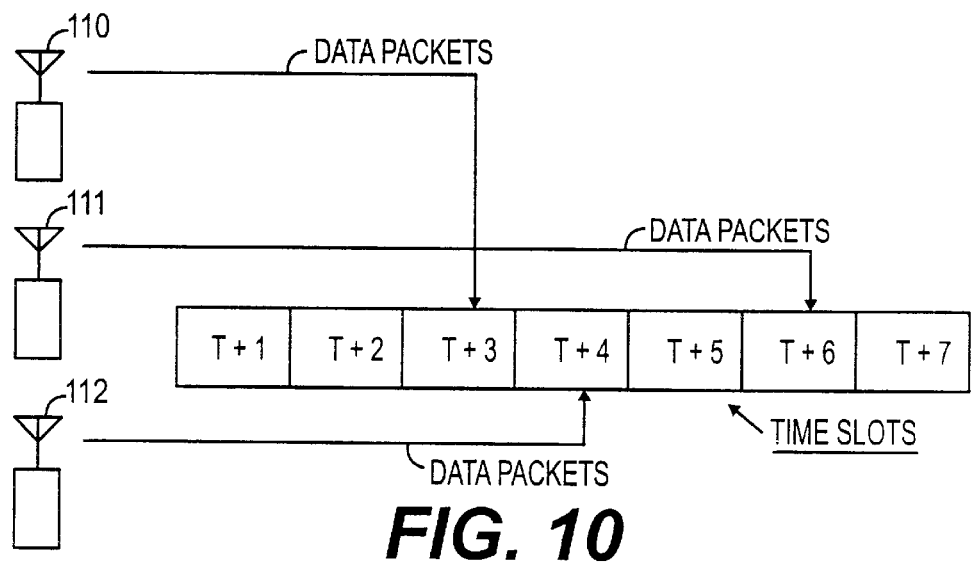
FIG. 10 illustrates the outline of a data packet transmission operation in the mobile communication apparatus according to the disclosed embodiment.

FIG. 10 illustrates the data packet transmission operation of the mobile communication apparatus according to the present invention. Mobile terminals 110 to 112, that have received the alert response from the base station 100, transmit the data packets according to the time slots 903 that are received. Upon receiving the alert response from the base station 100, the mobile terminals 110 to 112 check the orthogonal code numbers 902 in the received alert response, and transmit the data packets by using the time slots 903 and data channel numbers 904 in the alert response which stores the orthogonal code numbers 902 indicating the orthogonal codes used by the mobile terminals 110 to 112 as alert signals.

Figure 11:
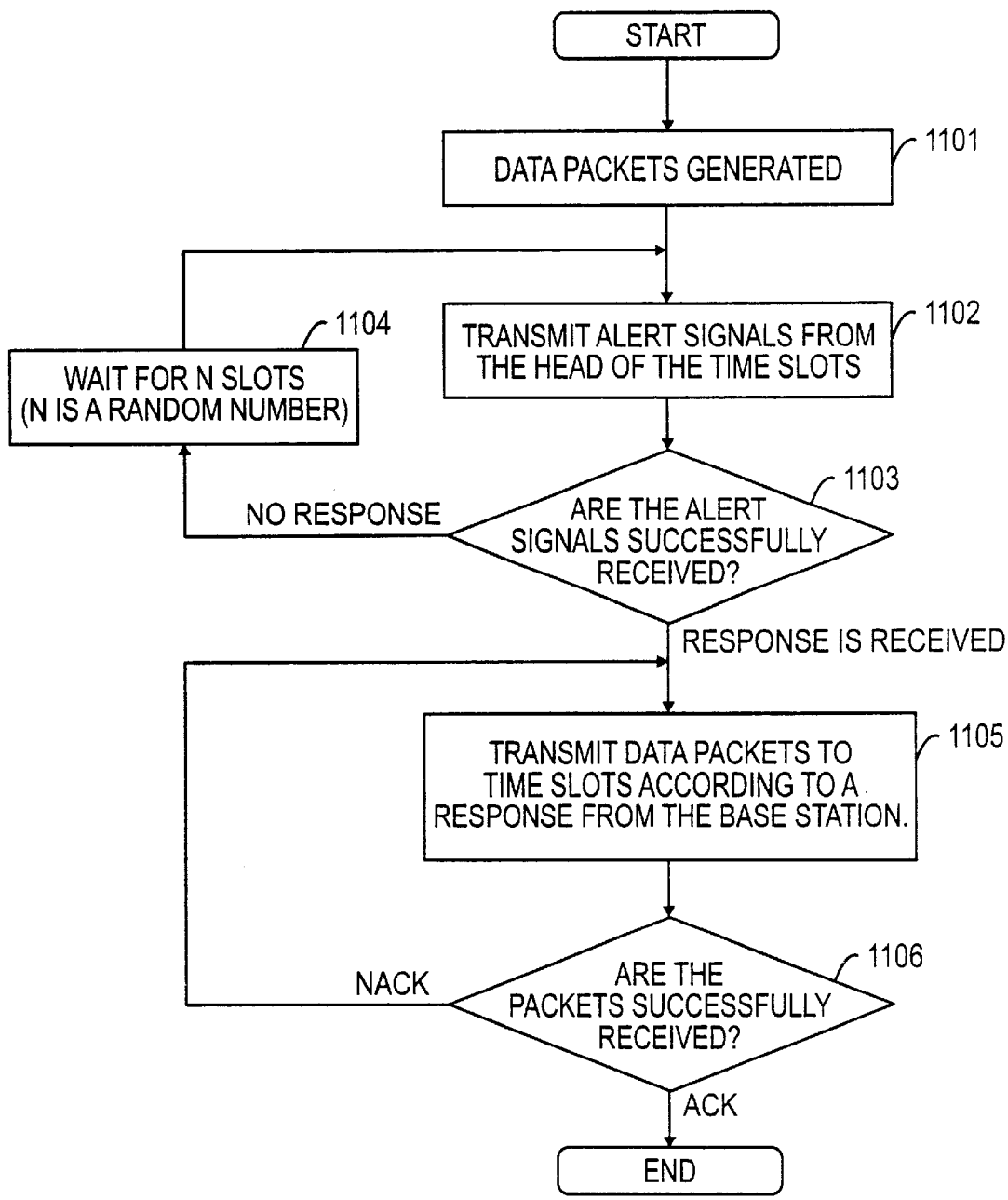
FIG. 11 illustrates the procedure of a processing for transmitting the data packet from the mobile terminals 110 to 112 in the mobile communication apparatus according to the disclosed embodiment.

FIG. 11 is a flow chart illustrating the procedure of a data packet transmission processing executed by the mobile terminals 110 to 112 in the mobile communication apparatus of the embodiment. Mobile terminals 110 to 112 transmit orthogonal codes 602 and 603 as alert signals, receive schedules for transmitting the data packets, and transmit the data packets to the base station 100. At step 1101, the mobile terminals 110 to 112 input, from the input/output unit 404, the data that are to be transmitted to the DSP 405. When there are generated data packets to be transmitted to the base station 100, the procedure proceeds to step 1102. At step 1102, orthogonal codes 601 to 603 are generated by the orthogonal code generator 500 in the alert channel modulator 412, and are transmitted to the base station 100 as alert signals from the head of the slot timings obtained by the pilot signals of the pilot channel modulator 413.

Then, at step 1103, it is checked whether the alert response from the base station 100 is received by the ACK/NACK or alert response channel demodulator 415. When there is no response from the base station 100, the procedure proceeds to a processing at a step 1104. In the processing at step 1104, the DSP 405 in the mobile terminals 110 to 112 temporarily discontinues the processing until a time corresponding to N slots (N is a random number) passes. The procedure then returns back to step 1102 where the orthogonal codes 601 to 603 are transmitted to the base station 100 as alert signals from the head of the slot timings represented by the pilot signals. At step 1103, the ACK/NACK or alert response channel demodulator 415 checks if the alert response from the base station 100 is received or not. When the response from the base station 100 is received, the procedure proceeds to step 1105.

At step 1105, the DSP 405 in the mobile terminals 110 to 112 reads an orthogonal code number 902 in the alert response from the base station 100, and checks if the orthogonal code number 902 that is read out represents the alert signal of a mobile terminal. When the orthogonal code number 902 in the alert response from the base station 100 represents the alert signal of the mobile terminal, data packets are transmitted from the data packet transmission modulator 411 to the base station 100 by using the time slots 903 and the data channel number 904 in the alert response.

At step 1106, the DSP 405 of the mobile terminals 110 to 112 checks if the base station 100 has successfully received the data packets that are transmitted or not. When the NACK from the base station 100 has been received by the ACK/NACK or alert response channel demodulator 415, the procedure returns back to the processing at the step 1105 and the data packets are transmitted again. When the ACK from the base station 100 has been received by the ACK/NACK or alert response channel demodulator 415 as a result of checking if the base station 100 has successfully received the data packets that are transmitted in the processing at the step 1106, the processing for transmitting the data packets ends.

Figure 12:
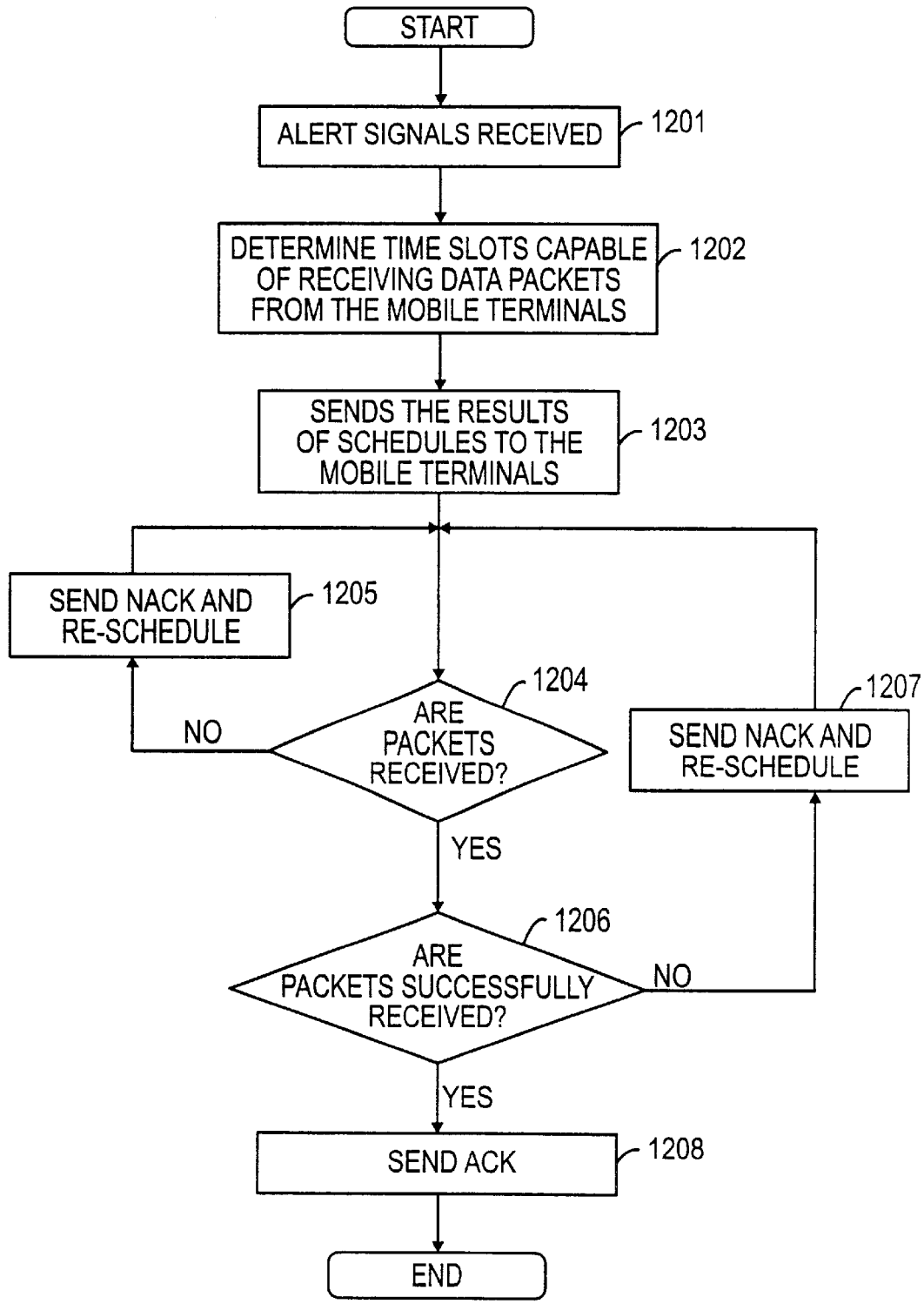
FIG. 12 illustrates the procedure of a processing for receiving the data packets by the base station 100 in the mobile communication apparatus according to the disclosed embodiment.

FIG. 12 is a flow chart of a process for receiving data packets in the base station 100. The base station 100 receives alert signals transmitted from the mobile terminals 110 to 112, schedules for transmitting the data packets are sent to the mobile terminals 110 to 112, and the data packets are received from the mobile terminals 110 to 112. When the alert signals transmitted from the mobile terminals 110 to 112 are received by the alert channel-matched filter 250 at step 1201, the alert channel accumulator 214 accumulates the orthogonal codes in the alert signals. When the alert channel accumulator 214 detects the orthogonal codes 601 to 603 out of the alert signals transmitted from the mobile terminals 110 to 112, the DSP 205 in the base station 100 selects empty slots and data channels in a processing at a step 1202, and determines the time slots 903 and data channel number 904 capable of receiving data packets from the mobile terminals 110–112 for each of the orthogonal codes 601 to 603 that are received. Here, the DSP 205 in the base station 100 may successively select the time slots 903 and the data channel numbers 904 and assign them, or may use any other assigning method that is used in the conventional reservation-type mobile communication systems.

Then, at step 1203, an address 901 of the transmitting source representing the address of the base station 100, orthogonal code numbers 902 representing the orthogonal codes 601 to 603 that are received, and the above determined time slots 903 and data channel numbers 904, are sent as schedules to the mobile terminals 110 to 112 through the ACK/NACK or alert response channel modulator 212. At step 1204, the DSP 205 in the base station 100 checks if the data packets from the mobile terminals 110 to 112 are received through the data channel-matched filters 241 to 243 or not. When the data packets have not been received by the above determined time slots 903 and data channel numbers 904, the procedure proceeds to step 1205. At step 1205, the DSP 205 in the base station sends, through the ACK/NACK or alert response channel modulator 212, the NACK to the mobile terminals from which no data pack was received and effects the re-scheduling. Then, the results of the re-scheduling are sent to the mobile terminals, and the procedure is returned back to step 1204.

The process proceeds to step 1206 when the data packets are received through the data channel-matched filters 241 to 243 as a result of checking, at step 1204, whether the data packets are received from the mobile terminals 110 to 112. At step 1206, the DSP 205 in the base station 100 checks if the data packets are successfully received or not. When an error is occurring during the transmission of the data packets, the process proceeds to step 1207. At step 1207, the DSP 205 in the base station 100 transmits, through the ACK/NACK or alert response channel modulator 212, the NACK to the mobile terminals that have transmitted erroneous data packets, and effects the re-scheduling. After the results of the re-scheduling are sent to the mobile terminals, the procedure is returned back to step 1204. When no error occurs during the transmission of the data packets as a result of checking, at step 1206, whether the data packets are successfully received or not, the process proceeds to step 1208 where the ACK is transmitted to the mobile terminals 110 to 112, and the processing for receiving the data packets ends.

According to the mobile communication apparatus of the present invention as described above, the data are transmitted and received after having determined the schedules by alert signals of orthogonal codes. Therefore, efficient communication of data is accomplished between the base station and a plurality of mobile terminals. Additionally, the results of multiplication of the same orthogonal codes assume particular values and the results of multiplication of different orthogonal codes assume a value of zero. Even when a plurality of alert signals are transmitted from a plurality of mobile terminals to the base station, it is possible to detect the individual alert signals. Furthermore, the reception of the alert signals is detected by accumulating the orthogonal codes of a plurality of bit periods making it possible to maintain, at a low level, the values of the alert signals transmitted from the mobile terminals.

The effects obtained by the disclosed embodiment of the present invention are briefly set forth as follows.

(1) The data are transmitted and received after having determined the schedules by alert signals of orthogonal codes. Therefore, efficient communication of data is accomplished between the base station and the plurality of mobile terminals.

(2) The results of multiplication of the same orthogonal codes assume particular values and the results of multiplication of different orthogonal codes assume a value of zero. Even when a plurality of alert signals are transmitted from a plurality of mobile terminals to the base station, therefore, it is possible to detect the individual alert signals.

(3) The reception of the alert signals is detected by accumulating the orthogonal codes of a plurality of bit periods making it possible to maintain, at a low level, the values of the alert signals transmitted from the mobile terminals.

While the present invention has been described above in conjunction with the preferred embodiment, one of ordinary skill in the art would be enabled by this disclosure to make various modifications to this embodiment and still be within the scope and spirit of the invention as defined in the appended claims.

What is claimed is:

1. A method of mobile communication by transmitting and receiving data between a base station and a plurality of mobile terminals, the method comprising the steps of:

transmitting a particular code selected from a plurality of codes stored in a table from a mobile terminal to the base station as an alert signal indicating a presence of data to be transmitted;

detecting, at the base station, whether the particular code is included in the alert signals transmitted from the mobile terminals to the base station;

when the particular code is detected in the alert signal transmitted from the mobile stations to the base station, an alert response to the alert signal representing the detected code and a schedule for transmitting the first data from the mobile terminal to the base station is transmitted from the base station to the mobile terminal; and when the particular code used for the alert signal transmitted from the mobile terminal to the base station is represented by the alert response transmitted from the base station to the mobile terminal, the transmission of the data from the mobile terminal to the base station is controlled based on said alert response.

2. The method of mobile communication according to claim 1, wherein the alert signal transmitted from the mobile terminal to the base station is multiplied by each of a plurality of codes generated in the base station in order to detect whether the particular code is included in the alert signal.

3. The method of mobile communication according to claim 2, wherein the result, of multiplication of the alert signal transmitted from the mobile terminal to the base station and the codes generated in the base station, is accumulated for each of a plurality of bit periods in order to detect whether the particular code is included in the alert signal.

4. A system for mobile communication which transmits and receives data between a base station and a plurality of mobile terminals, the system comprising:

a transmitter in a mobile terminal for transmitting a particular code selected from a plurality of codes stored in a table to the base station as alert signal indicating a presence of data to be transmitted;

a receiver in the base station for detecting, whether the particular code is included in the alert signal;

a transmitter in the base station which, if the particular code is detected, transmits to the mobile terminal an alert response to the alert signal representing the detected code; and a receiver in the mobile terminal which detects if the alert response represents the particular code for controlling transmission of the data in accordance with the alert response.

5. The system for mobile communication according to claim 4, wherein the alert response indicates a result of the detecting.

6. The system for mobile communication according to claim 4, wherein the alert signal reception means is provided with a multiplication means for multiplying the alert signal transmitted from the mobile terminal to the base station by each of a plurality of codes generated in the base station.

7. The system for mobile communication according to claim 6, wherein the receiver in the base station is provided with an accumulator for accumulating the result of multiplication of the alert signal transmitted from the mobile terminal to the base station and a plurality of predetermined codes for each of a plurality of bit periods.

8. A method of communicating between at least one mobile terminal and at least one base station, comprising the steps of:

transmitting a first signal from the mobile terminal to the base station, the first signal including a code selected from a plurality of codes indicating that first data is to be sent;

receiving and analyzing the first signal at the base station in order to determine if the code is present; and transmitting a second signal from the base station to the mobile terminal, the second signal containing second data corresponding to the code as well as third data indicating at least when the first data is to be sent.

9. The method according to claim 8, wherein the second signal contains a third data indicating when the first data is to be sent, or how the first data is to be sent.

10. The method according to claim 9, further comprising the step of transmitting the first data from the mobile terminal to the base station in accordance with the third data.

11. The method according to claim 8, wherein the code is selected from a set of orthogonal codes.

12. The method according to claim 8, wherein the second data is a code number.

13. The method according to claim 8, wherein the step of receiving and analyzing the first signal includes the steps of:

multiplying the code in the first signal by another code in the base station to arrive at a result; and evaluating the result in order to determine if a particular code is contained therein.

14. The method according to claim 13, wherein said code is selected from a set of orthogonal codes.

15. The method according to claim 14, wherein said another code is similar to said code although generated independently of said code.

16. The method according to claim 8, wherein the second signal indicates a result of the analyzing.

17. A mobile terminal which communicates with a base station, the mobile terminal comprising:

input/output unit;

a DSP connected to the input/output unit for controlling transmission or reception of signals to and from the mobile terminal;

a modulator connected to the input/output unit for selecting a code from a plurality of codes; and a demodulator connected to the input/output unit;

wherein the DSP transmits a first signal containing the selected code that indicates that the mobile terminal is to transmit first data, the first signal being modulated by the modulator;

and wherein the DSP receives a second signal containing second data corresponding to the code, the second signal being demodulated by the demodulator.

18. A mobile terminal according to claim 17, wherein the code is selected from a set of orthogonal codes.

19. A mobile terminal according to claim 17, wherein the second data is a code number.

20. A mobile terminal according to claim 17, wherein the second signal includes a third data indicating when the first data is to be sent, and the DSP transmits the first data in accordance with the third data.

21. A mobile terminal according to claim 20, wherein the third data also indicates how the first data should be transmitted.

22. A mobile terminal according to claim 17, wherein the DSP controls transmission of the first data based on the second signal.

23. A mobile terminal which communicates with a base station, the mobile terminal comprising:

an input/output unit;

means for controlling communication connected to the input/output unit for controlling transmission of signals to and from the mobile terminal;

a modulator connected to the input/output unit for selecting a code from a plurality of codes; and a demodulator connected to the input/output unit;

wherein the means for controlling communication transmits a first signal containing the code that indicates that the mobile terminal has first data to transmit, the first signal being modulated by the modulator;

and wherein the means for controlling communication receives a second signal containing second data corresponding to the code, the second signal being demodulated by the demodulator.

24. A mobile terminal according to claim 22, wherein the code is selected from a set of orthogonal codes.

25. A mobile terminal according to claim 24, wherein the second data is a code number.

26. A mobile terminal according to claim 23, wherein the second signal includes a third data indicating when the first data is to be sent, and the means for controlling communication transmits the first data in accordance with the third data.

27. A mobile terminal according to claim 26, wherein the third data also indicates how the first data should be transmitted.

28. A base station capable of communicating with one or more mobile terminals, comprising:

an accumulator for determining if an alert signal received from said one or more mobile terminals includes one of predetermined codes; and a transmitter for transmitting, if it is determined that the alert signal includes a code, an alert response to said one or more mobile terminals which transmitted the alert signal including the code, wherein the alert response includes information corresponding to the code.

29. The base station according to claim 28, further comprising a generator for generating a plurality of the predetermined codes that are for use of the accumulator to compared with in the alert signal.

30. The base station according to claim 29, wherein said codes and said code are orthogonal codes and wherein said generator means is an orthogonal code generator.

31. The base station according to claim 28, wherein the alert response includes information based on the comparison.

32. A base station capable of communicating with one or more mobile terminals comprising:

an antenna which receives an alert signal from a mobile terminal, the alert signal containing a particular code that indicates that the mobile terminal is to transmit data, an alert signal accumulator connected to said antenna, said alert signal accumulator comparing the particular code included in the alert signal with a plurality of codes; and a modulator connected between the alert signal accumulator and the antenna, the modulator transmitting a modulated alert response to the mobile terminals via the antenna, the modulated alert response containing information based upon a result of the comparing performed by the alert signal accumulator or information corresponding to the particular code.

33. The base station according to claim 32, wherein the alert signal accumulator includes a code generator and a plurality of accumulators.

34. In a base station, a method of communicating with a plurality of mobile terminals comprising the steps of:

receiving an alert signal from a mobile terminal;

evaluating the alert signal for the presence of a particular code by comparing the alert signal with a plurality of codes; and if the particular code is present, transmitting an alert response to the mobile terminal, the alert response containing data corresponding to the particular code.

35. The method according to claim 34, further comprising the step of:

after sending the alert response to the mobile terminal, receiving other data from the mobile terminal according to the alert response.

36. The method according to claim 34, wherein the alert response indicates a result of the comparing.

* * * * *